M. & R. C. GIVLER.
PHOTOGRAPHIC CAMERA.
APPLICATION FILED AUG. 14, 1917.
1,271,156.
Patented July 2, 1918.
2 SHEETS—SHEET 1.
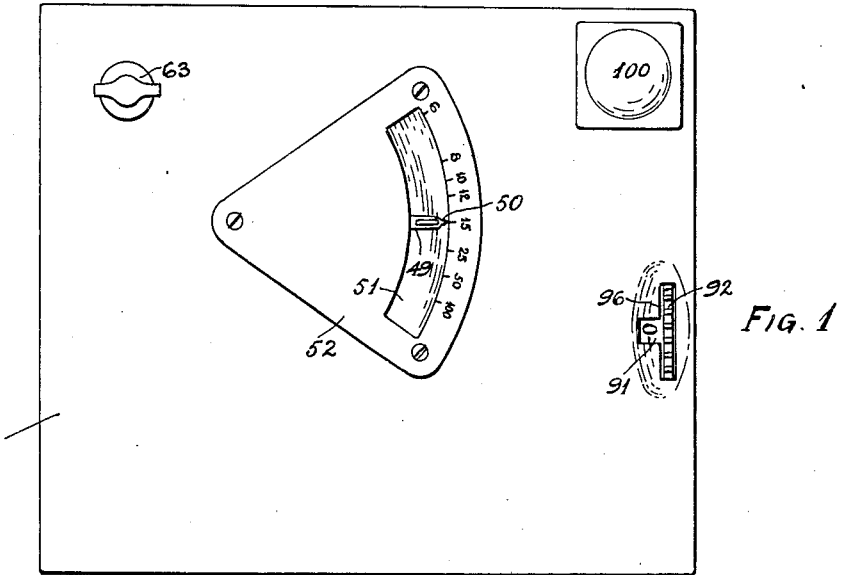
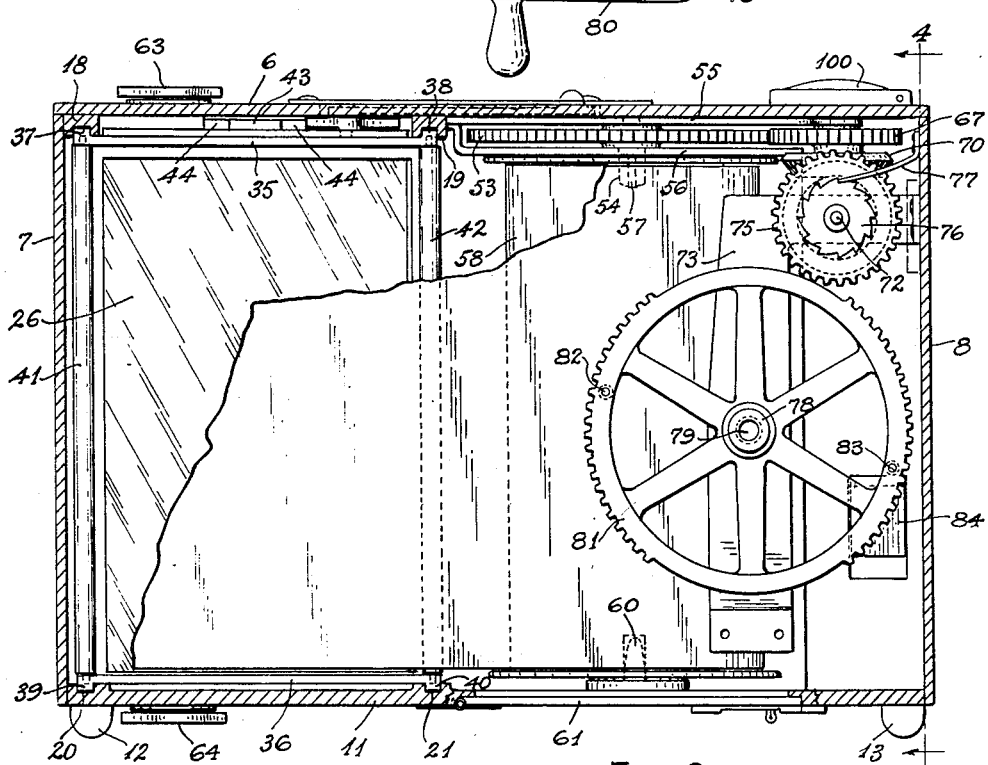
Inventors
Margaret Givler
Robert Chenault Givler
By C. D. Haskins
Attorney

M. & R. C. GIVLER.
PHOTOGRAPHIC CAMERA.
APPLICATION FILED AUG. 14, 1917.

1,271,156.

Patented July 2, 1918.
2 SHEETS—SHEET 2.

Inventors
Margaret Givler
Robert Chenault Givler
By
Attorney
C. D. Hawkins

UNITED STATES PATENT OFFICE.

MARGARET GIVLER AND ROBERT CHENAULT GIVLER, OF SEATTLE, WASHINGTON.

PHOTOGRAPHIC CAMERA.

1,271,156.

Specification of Letters Patent.

Patented July 2, 1918.

Application filed August 14, 1917. Serial No. 186,236.

*To all whom it may concern:*

Be it known that we, MARGARET GIVLER and ROBERT CHENAULT GIVLER, citizens of the United States, residing at Seattle, in the county of King and State of Washington, have invented a certain new and useful Improvement in Photographic Cameras, of which the following is a specification.

Our invention relates to improvements in photographic cameras, and the object of our invention is to provide a photographic camera which shall embody mechanism that shall be adapted to be operated to cause a plurality of contiguous portions of a sensitized photographic film, each portion in quick succession, to be exposed momentarily to the action of its lens whereby a plurality of photographic negatives may be produced on said film each of which negatives shall represent a different view of moving objects or a like view of stationary objects that may be disposed in front of said lens, said mechanism being actuated continuously during such operation.

A further object of our invention is to provide a camera which shall embody devices for adjusting the focal distance between the exposed portion of a film and the lens, properly to correspond with the distance between the camera and the objects to be photographed, which devices shall be so formed and disposed that the exterior dimensions of the camera shall be small in proportion to the maximum effective focal distance between its object lens and the exposed portion of the film.

We accomplish these objects by mechanism illustrated in the accompanying drawings, wherein—

Figure 1 is a plan view of a camera embodying our invention;

Fig. 2 is an enlarged view of the same in vertical section on broken line 2, 2 of Fig. 4;

Figure 3:
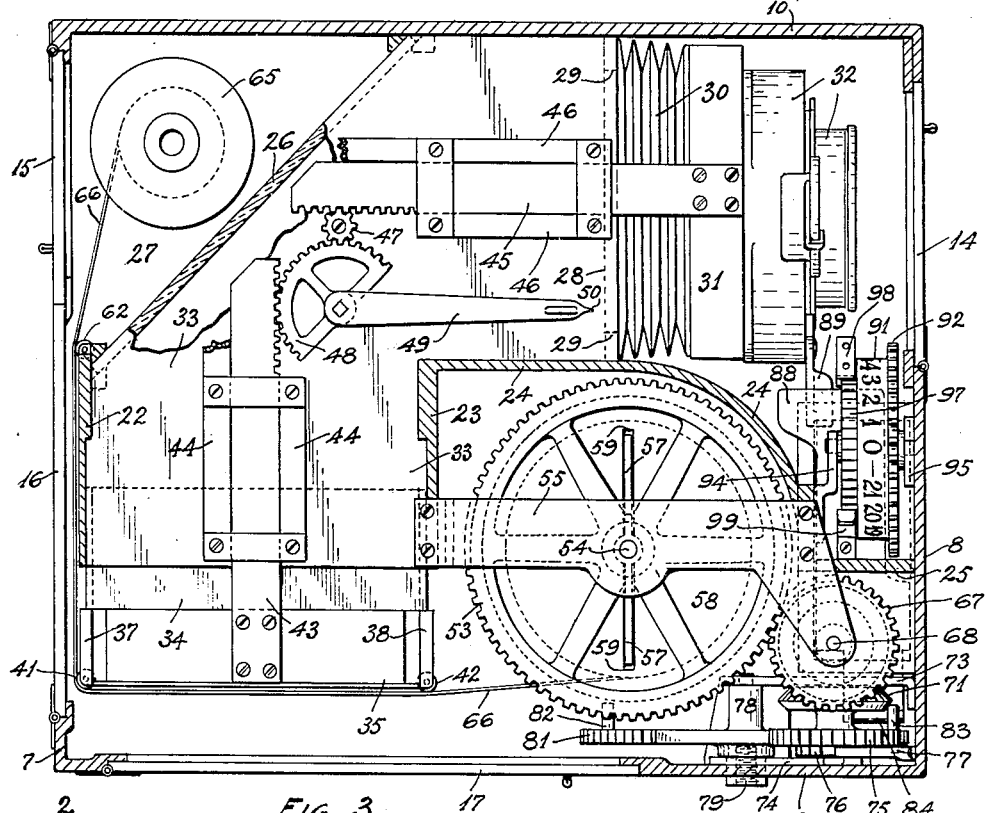
Fig. 3 is an enlarged view of the same with its top wall removed.

Referring to the drawings, throughout which like reference numerals indicate like parts, a rectangular inclosing case is formed to have a top wall 6, a vertical rearward end wall 7, a vertical front end wall 8, vertical side walls 9 and 10, and a bottom wall 11 which is provided with knobs, like knobs 12 and 13, that are fixed to its under side to serve as feet for supporting the case in a position spaced from any surface upon which the camera may be placed.

Adjacent to the side wall 10, the front end wall 8 is provided with a door 14, and the rearward end wall 7 is provided with double doors 15 and 16, while the side wall 9 is provided with a door 17 which extends from a vertical line near the rearward end wall 7 for about two thirds of the distance therefrom to the front end wall 8.

Fastened to the underside of the top wall 6 are two grooved guiding cleats 18 and 19 which are disposed to extend transversely from a line near the top of the door 17 for a distance nearly half way across the case, the cleat 18 being spaced a short distance from the rearward end wall 7 and the cleat 19 being near the center of the lengthwise distance of the case.

The upper side of the bottom wall 11 is provided with guiding grooves 20 and 21 which are parallel with and directly under the grooves of the cleats 18 and 19 respectively.

Disposed parallel with and slightly spaced from the inner side of the door 16 is a partition 22 that extends from the bottom wall 11 to the top wall 6 and whose width extends from a point near the edge of the door 15 for about two thirds of the distance to the hinged edge of the door 16, as indicated in Fig. 3.

Figure 4:
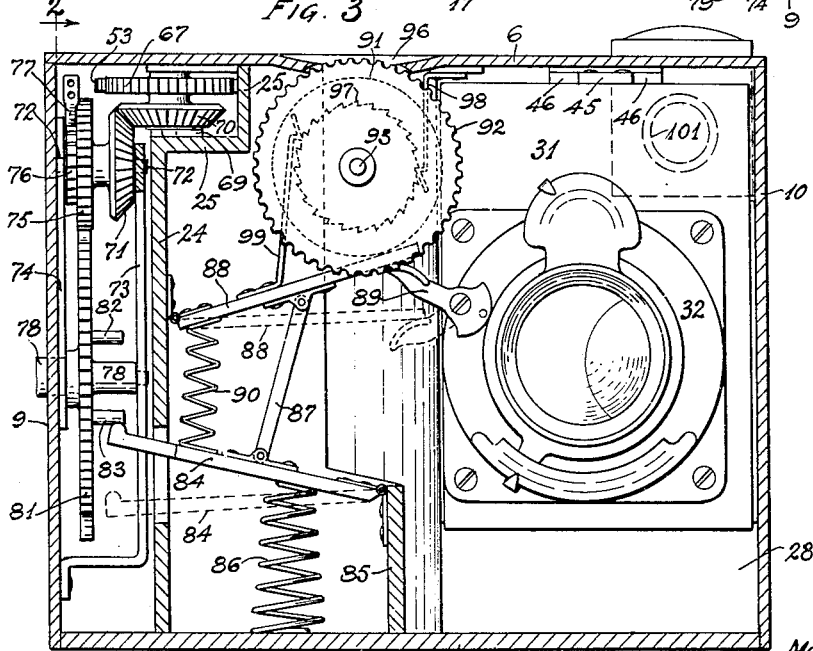
Fig. 4 is an enlarged view of the same in vertical section on broken line 4, 4 of Fig. 2 whereby internal parts are shown in front elevation.

Directly opposite the partition 22 and parallel therewith and widely spaced therefrom is a like vertical partition 23 whose vertical edge (that is nearer the side wall 10) joins the vertical edge of a partition 24 that extends at a right angle therefrom for a distance directly toward the front end wall 8 thence in a curve toward the side wall 9 through and beyond the quadrant of a circle, thence again directly toward the wall 8 to unite therewith, as indicated by full lines and dotted lines in Fig. 3 and by full lines in Fig. 4.

Adjacent to the wall 8 a small portion of the upper part of the partition 24 is provided with an offset 25 as indicated in Fig. 4.

Extending across the corner of the interior of the case at an angle of 45 degrees from the side wall 10 to the nearer edge of the partition 22 is a mirror 26 which serves as a partition to form a triangular compartment 27 in addition to serving as a reflector to cause any rays of light entering the case through the door 14 to be reflected at a right angle directly toward the plane of the door 17.

As indicated by dotted lines in Fig. 3 and by full lines in Fig. 4, a vertical partition 28 is disposed to extend from the partition 24 to the side wall 10 which partition 28 is provided with a circular opening therethrough, which opening is of a diameter indicated by dots 29 in Fig. 3, and on that side of it nearer the door 14 is fastened one end of extensible walls 30, of accordion-like construction, whose other end is fastened to the rearward side of a rectangular box 31.

Fastened to the front side of a rectangular box 31 is a photographic lens box 32 that contains lenses and operative shutter mechanism of forms well known to those skilled in the art, said lens box 32 being disposed directly opposite the doorway of the door 14.

The front and back walls of the box 31 are provided with openings therethrough so that when the door 14 is wide open and the shutter of the lens box 32 is actuated to open then rays of light may extend through the lens box 32, the box 31 and between the extensible walls 30 to impinge on the mirror 26.

Joined to the upper edge portion of the mirror 26, the partitions 22, 23, 24 and 28 and to the side wall 10, and slightly spaced from the under side of the top wall 6 is a horizontally disposed plate 33.

Disposed telescopically to fit within the space between the partitions 22 and 23 is a rectangular frame 34 upon whose outer top and bottom edge portions are fastened transverse metal plates 35 and 36, respectively, whose opposite end portions are provided with tongues 37 and 38 and tongues 39 and 40, respectively, which are slidably disposed in the grooves of the cleats 18 and 19 and in the grooves 20 and 21 of the bottom wall 11, respectively, whereby the frame 34 may be guided in its sliding movements toward and away from the mirror 26.

With its ends pivotally mounted in the outer end portions of the tongues 37 and 39 is a vertically disposed roller 41, and in a like manner a roller 42 is rotatably disposed to extend between the outer end portions of the tongues 38 and 40.

Slidably mounted on the upper side of the plate 33 is a rack-bar 43 that is guided in its endwise movements by guide-strips 44, as shown more clearly in Fig. 3, and one end portion of said rack-bar 43 is fastened to the central portion of the metal plate 35 whereby endwise movements of said rack-bar 43 shall cause the frame 34 to move toward or away from the mirror 26.

Also slidably mounted on the upper side of the plate 33, to extend in a direction at right angles to the rack-bar 43, is another rack-bar 45 which is guided in its endwise movements toward and away from the mirror 26 by guide-strips 46 and one end portion of said rack-bar 45 is fastened to the central portion of the top wall of the rectangular box 31, whereby the lens box 32 shall be moved rearwardly and frontwardly in response to endwise movements of said rack-bar 43.

As shown in Fig. 3, the rack-bars 43 and 45 are each provided with teeth on their adjacent end edge portions, the teeth of the rack-bar 45 being in operative engagement with a pinion 47 that is pivotally mounted on the plate 33, while the teeth of the rack-bar 43 are in operative engagement with the teeth of a segment 48 of a gearwheel that is also pivotally mounted on the plate 33, the teeth of said segment 48 being also in operative engagement with the teeth of the pinion 47, whereby a rotative movement of the segment 48 in a clockwise direction will cause both the lens box 32 and the frame 34 simultaneously to move toward the mirror 26, while a rotative movement of it in a contra-clockwise direction will cause said lens box 32 and said frame 34 both to move in a direction away from said mirror 26.

Attached to the segment 48 is an arm 49 which extends forward therefrom to terminate in a pointer 50 that is exposed through an opening 51, of the form of a segment of a circle, that extends through the top wall 6 of the case, and through which opening 51 one's finger may gain access to the end portion of the arm 49 in the operation of moving said arm 49 to cause the rack-bars 43 and 45 to approach or recede from the mirror 26.

The segmentally formed opening 51 is provided with an escutcheon 52 that is fastened on the upper surface of the top wall 6, and upon said escutcheon 52 is inscribed numbers and the division marks of a scale, as shown in Fig. 1, which numbers and division marks represent different distances, in feet, between the camera and objects to be photographed, and said division marks are so relatively disposed that a movement of the pointer 50 to any particular one of said division marks shall cause the lens box 32 to be disposed at the proper focal distance from the mirror 26 for taking pictures of objects that are at the same distance from the camera that is indicated by that particular one of said division marks.

A gearwheel 53 is fastened to a shaft 54, which is rotatably mounted in bearings formed in two spaced frame plates 55 and 56 that are secured to the upper ends of the partitions 23 and 24, as indicated in Figs. 2 and 3.

One end portion of the shaft 54 projects downwardly through the frame plate 56 and such downwardly projecting end portion is provided with oppositely projecting radial arms 57, and removably mounted on said downwardly projecting end portion is the upper end of a cylinder 58 that is provided with oppositely disposed radial slots 59, within which projects the radial arms 57.

The lower end of the cylinder 58 is freely mounted on a pivotal support 60 that is fixed to the upper side of a door 61 that is provided in the bottom wall 11 of the case so that when said door 61 is opened to swing downwardly, then the cylinder 58 may fall through the doorway of the door 61, thus to remove said cylinder 58 from the case.

Rotatably mounted in bearings attached to the vertical edge portion of the partition 22 rearward of the adjacent edge of the mirror 26 is a vertically disposed roller 62.

Within the three cornered compartment 27 the top wall 6 and bottom wall 11 are provided with oppositely disposed pivotal supports 63 and 64, respectively, which are each movable in directions toward and away from each other, and on which is removably mounted in a well known manner a spool 65 containing a sensitized photographic film 66, one portion of which is unwound to extend from said spool 65 to engage with the roller 62, thence to engage with the roller 41, thence to engage with the roller 42, thence to extend to the cylinder 58 to which its outer end is attached, whereby it shall be wound on to said cylinder in response to rotary movements of the gearwheel 53 while always presenting a portion of its sensitized side to any rays of light that may be reflected by the mirror 26.

Operatively disposed to engage with the gearwheel 53 is another smaller gearwheel 67 which is fastened to a shaft 68 the upper end of which is disposed in a bearing formed in the frame plate 55 and the lower end of which is disposed in a bearing block 69 that is mounted on the offset portion 25 of the partition 24.

Also fastened on the shaft 68 is a beveled gear wheel 70 that operatively engages with another beveled gearwheel 71 that is fastened on a shaft 72 that is mounted to rotate in bearings formed in a bracket 73 and a plate 74, also mounted on the shaft 72 is a gearwheel 75 and a ratchetwheel 76, said ratchetwheel 76 being in operative engagement with a spring-like pawl 77 that is fastened to the front wall 8.

Rotatably disposed in bearings also formed in the bracket 73 and plate 74 is a shaft 78 the larger end of which projects through the side wall 9, and the outwardly projecting end of said shaft 78 is provided with a screw-threaded hole 79, as indicated by dotted lines in Fig. 3, and within which hole 79 may be disposed the screw-threaded shank of a crank, like the crank 80 shown in Fig. 1, whereby said shaft 78 may be rotated in a clockwise direction.

Mounted on the shaft 78 is a gearwheel 81 whose teeth are removed from oppositely disposed segmental portions thereof, as shown more clearly in Fig. 2, said gearwheel 81 being so disposed that the series of teeth on each of the other two oppositely disposed segmental portions shall successively make operative engagement with the teeth of the gearwheel 75 in response to a rotation of the shaft 78 which rotation may be effected by turning the crank 80.

Thus a continuous rotation of the shaft 78 in an obvious manner will permit the gearwheel 75 to stop twice during each revolution of said shaft 78 with the result that the cylinder 58 will rotatively move intermittently to wind the film 66 thereon thus to cause successive portions of said film 66 to stop for an instant to be exposed to rays of light reflected from the mirror 26.

Each of the series of the teeth of the oppositely disposed segmental portions of the wheel 81 is of such length as will cause the film 66 to be intermittently moved for a distance equal to the distance between the partitions 22 and 23.

In order to actuate the shutter of the lens box 32 only while a portion of the film 66 is at rest in a position to receive rays of light from the mirror 26, the wheel 81 is provided with two oppositely disposed pins 82 and 83 that project from its inner side surface and in the path of said pins 82 and 83 is disposed the free end of a lever 84 whose other end is hinged to a support 85, as shown more clearly in Fig. 4, with which lever 84 is associated a helical compression spring 86 that forces said lever 84 to swing upwardly when it is not being actuated by its engagement with one or the other of the moving pins 82 or 83, which engagement depresses said lever 84 in the course of each revolution of the wheel 81.

Articulated to the lever 84 is the lower end of a connecting rod 87 whose upper end is articulated with another lever 88 one end of which is hinged to the side of the partition 24, as more clearly shown in Fig. 4, and the other end of which is disposed to adapt it operatively to engage with the shutter actuating lever 89 of the lens box whereby a depression of said lever 88, to its position indicated by dotted lines in said Fig. 4, will cause the shutter actuating lever 89 to operate the shutter of the lens box 38 in a well known manner.

The pins 82 and 83 are so disposed on the wheel 81 with relation to the two series of teeth thereof that the shutter actuating lever 89 can operate to open and close the shutter of the lens box 32 only when the film 66 is at rest.

The width of the lever 84 is such as to cause it closely to fit the space between the partition 24 and the front end wall 8, thereby to admit no ray of light through the slot in the partition 24 through which the free end of said lever 84 projects.

Connected to the top surface of the lever 84 and the under surface of the lever 88, adjacent to the partition 24, is a flexible screen 90, of accordion-like construction, which also serves to prevent light from passing through said slot in the partition 24 through which the free end portion of the lever 84 projects.

In order to indicate the number of portions of the film 66 that have been successively exposed, there is provided a disk 91, whose periphery is provided with equally spaced numbers and which is provided with a notched flange 92, which disk is mounted on a shaft 93 that is rotatably disposed in bearing brackets 94 and 95 that are secured respectively to the partition 24 and the front end wall 8 in positions to adapt the notched flange 92 to project upwardly through a slotted opening 96 that extends through a depressed portion of the top wall 6 adjacent to the front end wall 8, said slotted opening being of such width as will expose to view any one of said numbers that may be opposite said slotted opening.

Also fastened on the shaft 93, adjacent to the disk 91, is a ratchetwheel 97 with which is associated two spring-like pawls 98 and 99, which ratchetwheel 97 and pawls 98 and 99 are more clearly shown by dotted lines in Fig. 4.

The pawl 98 is fastened to the underside of the top wall 6, while the pawl 99 is attached to the lever 88, whereby each depression of said lever 88 will rotatively move the ratchetwheel 97 one tooth forward, the number of teeth in the ratchetwheel 97 being equal to the number of units inscribed on the periphery of the disk 91.

If it be desired to set the disk 91 to zero, at any time, it is only necessary to engage one's finger with the notches of the flange 92 and thereupon move the disk in a contra-clockwise direction until the zero character is exposed to view; and thereafter each numeral that is successively exposed will, in an obvious manner, indicate the number of portions of the film 66 that has been exposed.

In the upper right hand corner of the front end of the case is a "finder" 100, of a well known form of construction, there being provided a circular hole 101 in the door 14 in a position opposite the lens of said "finder" 100, the position of which hole 101 is indicated by broken circular lines in Fig. 4.

The operation of our camera when constructed in accordance with the accompanying drawings may be described as follows:
A roll of sensitized photographic film is rotatably disposed, in an obvious manner, in the compartment 27 whereupon its outer end portion is extended to engage with the rollers 62, 41 and 42, thence to be attached to the periphery of the cylinder 58 and thereupon the arm 49 is moved to cause the pointer 50 to register with the division mark of the numeral representing the distance between the camera and the objects to be photographed with the result that the lens box 32 and the frame 34 will both be moved to a proper focal distance with respect to the mirror 26.

Then the disk 91 is moved to expose the zero character, whereupon the objects to be photographed may be observed through the "finder" 100, in a well known manner, and thereupon the door 14 is opened wide.

Then, the camera being in a position to photograph the desired objects, which may be stationary or moving, the crank 80 is continuously turned until a numeral on the disk 91 is exposed that represents the required number of exposures of successive portions of the film 66.

Each revolution of the crank 80 will cause the film 66 to be intermittently moved to expose two portions of the film 66 and while each of said portions is at rest for a moment the shutter of the lens box 32 will be opened for a moment by the action of the lever 88 on the shutter actuating lever 89, thereby to permit the object lens of the lens box 32 to be exposed to the objects to be photographed, the image of which objects will be reflected from the mirror 26 against the sensitized side of that portion of the film 66 which at the time is at rest opposite the space between the partitions 22 and 23.

Thus, when the required number of exposures of the successive portions of the film 66 have been made, as indicated by a numeral on the periphery of the disk 91, then the crank 80 may be removed and the door 14 closed until other objects are to be photographed.

When all portions of the film 66 have been exposed, then the entire film 66 will be wound on the cylinder 58, whereupon the door 61 may be opened to swing downwardly to permit the cylinder 58 to drop through the bottom wall 11 thereby to extract said cylinder 58 from the case.

Obviously, changes may be made in the forms, dimensions and arrangement of parts of our invention without departing from the spirit thereof.

What we claim is:

1. A camera of the class described, which embodies an inclosing case provided with a door in its front end wall; a photographic lens box disposed within said inclosing case and adapted to be adjustably movable in directions parallel with the adjacent side wall; means for disposing successive portions of a sensitized photographic film in a vertical plane within said inclosing case adjacent to and parallel with the rearward portion of the other side wall of said inclosing case; a mirror within the rearward end portion of said inclosing case and disposed in a vertical plane that is at an angle of 45 degrees with relation to the plane of the adjacent vertical side wall and rearward end wall to adapt it to reflect rays of light from said lens box to said successive portions of said film; operative mechanism for intermittently moving said film successively to dispose different portions thereof in a position to expose its sensitized side to the action of light reflected from said mirror in response to a continuous operation of said mechanism; automatic means associated with said mechanism and with the shutter mechanism of said lens box whereby the shutter of said lens box shall be opened momentarily when a portion of said film is momentarily stopped in a position to expose it to rays of light reflected from said mirror; and means for indicating at any time the number of said portions of said film that have been exposed.

2. A camera of the class described, which embodies an inclosing case provided with a door in its front end wall; a photographic lens box disposed within said inclosing case and adapted to be adjustably movable in directions parallel with the adjacent side wall; means for disposing successive portions of a sensitized photographic film in a vertical plane within said inclosing case adjacent to and parallel with the rearward portion of the other side wall of said inclosing case; a mirror within the rearward end portion of said inclosing case and disposed in a vertical plane that is at an angle of 45 degrees with relation to the plane of the adjacent vertical side wall and rearward end wall to adapt it to reflect rays of light from said lens box to said successive portions of said film; operative mechanism for intermittently moving said film successively to dispose different portions thereof in a position to expose its sensitized side to the action of light reflected from said mirror in response to a continuous operation of said operative mechanism; and automatic means associated with said mechanism and with the shutter mechanism of said lens box whereby the shutter of said lens box shall be opened momentarily when a portion of said film is momentarily stopped in a position to expose it to rays of light reflected from said mirror.

3. A camera of the class described, which embodies an inclosing case provided with a door in its front end wall; a photographic lens box disposed within said inclosing case and adapted to be adjustably movable in directions parallel with the adjacent side wall; means for disposing successive portions of a sensitized photographic film in a vertical plane within said inclosing case adjacent to and parallel with the rearward portion of the other side wall of said inclosing case; and a mirror within the rearward end portion of said inclosing case and disposed in a vertical plane that is at an angle of 45 degrees with relation to the plane of the adjacent vertical side wall and rearward end wall to adapt it to reflect rays of light from said lens box to said successive portions of said film.

4. A camera of the class described, which embodies an inclosing case; an adjustably movable lens box disposed in said inclosing case; a mirror disposed in a vertical plane within said inclosing case in a position rearwardly from said lens box and at an angle of 45 degrees with relation to the axis of the object lens of said lens box; and operative mechanism associated with said inclosing case and adapted intermittently to move a sensitized photographic film to cause contiguous portions thereof successively to be exposed to rays of light reflected from said mirror.

In witness whereof, we hereunto subscribe our names this 7th day of August, A. D. 1917.

MARGARET GIVLER.
ROBERT CHENAULT GIVLER.